(12) United States Patent
Yamamoto et al.

(10) Patent No.: US 7,330,918 B2
(45) Date of Patent: Feb. 12, 2008

(54) BUFFER MEMORY MANAGEMENT METHOD AND SYSTEM

(75) Inventors: Hiroaki Yamamoto, Yokohama (JP); Seiji Miyahara, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 86 days.

(21) Appl. No.: 10/723,993

(22) Filed: Nov. 26, 2003

(65) Prior Publication Data

US 2004/0131063 A1    Jul. 8, 2004

(30) Foreign Application Priority Data

Nov. 27, 2002  (JP)  ............... 2002-344424

(51) Int. Cl.
    *G06F 5/00*  (2006.01)
(52) U.S. Cl. .............. 710/56; 370/229; 370/230
(58) Field of Classification Search ........ 370/229–230, 370/235, 395.72, 412, 429; 710/29–30, 52, 710/56, 58, 310
    See application file for complete search history.

(56) References Cited

U.S. PATENT DOCUMENTS

| | | | |
|---|---|---|---|
| 4,891,788 A * | 1/1990 | Kreifels .................. | 365/49 |
| 6,240,066 B1 * | 5/2001 | Nagarajan et al. ........ | 370/230 |
| 6,421,350 B1 * | 7/2002 | Szurkowski et al. ...... | 370/235 |
| 6,459,682 B1 * | 10/2002 | Ellesson et al. .......... | 370/235 |
| 6,526,070 B1 * | 2/2003 | Bernath et al. .......... | 370/509 |
| 6,556,572 B1 * | 4/2003 | Ishida ..................... | 370/395.41 |
| 6,570,872 B1 * | 5/2003 | Beshai et al. ............ | 370/369 |
| 6,788,697 B1 * | 9/2004 | Aweya et al. ............ | 370/412 |
| 6,907,001 B1 * | 6/2005 | Nakayama et al. ...... | 370/230 |
| 2002/0049608 A1 * | 4/2002 | Hartsell et al. .......... | 705/1 |
| 2002/0097733 A1 * | 7/2002 | Yamamoto ............... | 370/412 |

FOREIGN PATENT DOCUMENTS

| | | |
|---|---|---|
| JP | 2000201150 | 7/2000 |
| JP | 2002-344502 | 11/2002 |

OTHER PUBLICATIONS

Notification of Reason for Rejection dated Apr. 17, 2007 for corresponding Japanese Application JP 2002-344424.
Yoshihiro Ito, "Development of a Flexible and General Evaluation Tool for IP Networks", Technical Report of IEICE, Sep. 28, 2006, pp. 21-26, Saitma Japan.

* cited by examiner

*Primary Examiner*—Alford Kindred
*Assistant Examiner*—Chun-Kuan Lee
(74) *Attorney, Agent, or Firm*—Katten Muchin Rosenman LLP

(57) ABSTRACT

A packet buffer management method and system are provided which enable maximum utilization of the hardware resources of the buffer memory, and which are optimum for the number of preset physical ports in use or for the number of service class (CoS) areas. In the buffer memory management method in a packet transmission/reception device, for storing a received packet in the buffer memory and controlling writing and reading of packets to and from the above buffer memory, the control methods are set in units of the service class contained in the header portion of received packets, and areas allocated to each service class in the buffer memory storing received packets are modified according to the set number of the above service classes.

6 Claims, 18 Drawing Sheets

DIAGRAM OF CAM AND SRAM DATA CONFIGURATION

FIG. 3

CONVERSION TABLE

| | (1) | (2) | (3) | (4) | (5) |
|---|---|---|---|---|---|
| 0 | OUTPUT PORT | OUTPUT PORT CoS NUMBER | START ADDRESS | END ADDRESS | CoS CHARACTERISTIC NUMBER |
| 1 | OUTPUT PORT | OUTPUT PORT CoS NUMBER | START ADDRESS | END ADDRESS | CoS CHARACTERISTIC NUMBER |
| 2 | OUTPUT PORT | OUTPUT PORT CoS NUMBER | START ADDRESS | END ADDRESS | CoS CHARACTERISTIC NUMBER |
| ⋮ | | | ~ | | |
| M | OUTPUT PORT | OUTPUT PORT CoS NUMBER | START ADDRESS | END ADDRESS | CoS CHARACTERISTIC NUMBER |

DIAGRAM OF PACKET BUFFER CONFIGURATION

FIG. 5

| | |
|---|---|
| 0 | CHARACTERISTIC CONTENTS (LOSS/ERROR INSERTION/DELAY INSERTION/REROUTING ETC) |
| 1 | CHARACTERISTIC CONTENTS (LOSS/ERROR INSERTION/DELAY INSERTION/REROUTING ETC) |
| 2 | CHARACTERISTIC CONTENTS (LOSS/ERROR INSERTION/DELAY INSERTION/REROUTING ETC) |
| ∼ | ∼ |
| M | CHARACTERISTIC CONTENTS (LOSS/ERROR INSERTION/DELAY INSERTION/REROUTING ETC) |

CoS CHARACTERISTIC TABLE

RELATION BETWEEN POINTER MANAGEMENT MEMORY AND PACKET BUFFER

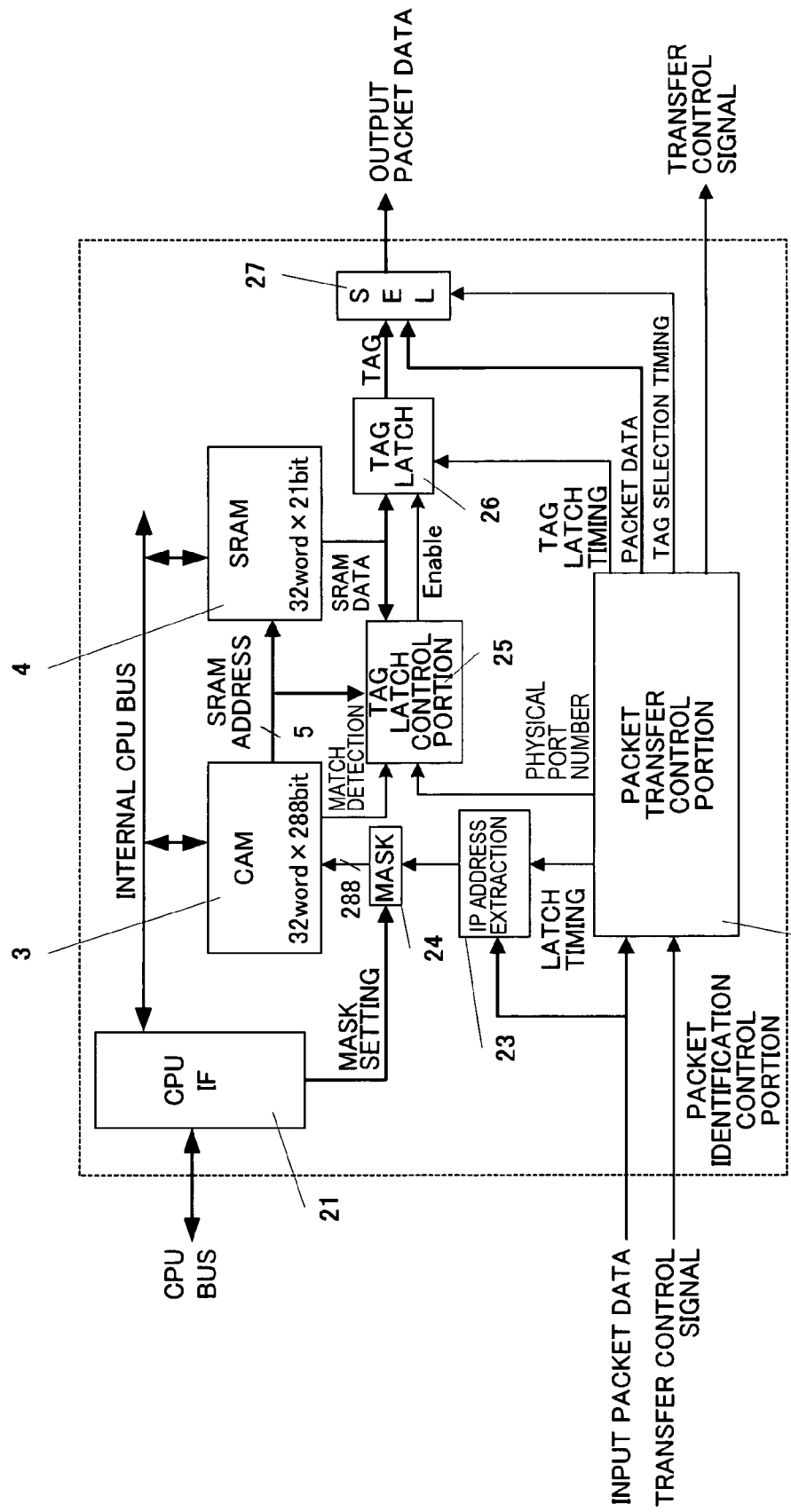
FIG. 10 DETAILED BLOCK DIAGRAM OF PACKET IDENTIFICATION CONTROL PORTION IN ONE EMBODIMENT

FIG. 11A

CAM

| ADDRESS | IP ADDRESS (256 BITS) | TCP/UDP PORT NO. (32 BITS) |
|---|---|---|
| 0 | IP ADDRESS 1 | PORT NUMBER 1 |
| 1 | IP ADDRESS 2 | PORT NUMBER 2 |
| 2 | IP ADDRESS 3 | PORT NUMBER 3 |
| 3 | IP ADDRESS 4 | PORT NUMBER 4 |
| 4 | IP ADDRESS 5 | PORT NUMBER 5 |
| 5 | IP ADDRESS 6 | PORT NUMBER 6 |
| 6 | IP ADDRESS 7 | PORT NUMBER 7 |
| 7 | IP ADDRESS 8 | PORT NUMBER 8 |
| 8 | IP ADDRESS 9 | PORT NUMBER 9 |
| 9 | IP ADDRESS 10 | PORT NUMBER 10 |
| 10 | IP ADDRESS 11 | PORT NUMBER 11 |
| 11 | IP ADDRESS 12 | PORT NUMBER 12 |
| 12 | IP ADDRESS 13 | PORT NUMBER 13 |
| 13 | IP ADDRESS 14 | PORT NUMBER 14 |
| 14 | IP ADDRESS 15 | PORT NUMBER 15 |
| 15 | IP ADDRESS 16 | PORT NUMBER 16 |
| 16 | IP ADDRESS 17 | PORT NUMBER 17 |
| 17 | IP ADDRESS 18 | PORT NUMBER 18 |
| 18 ... 31 | UNDEFINED | |

FIG. 11B

SRAM

| ADDRESS | EN BIT (1 BIT) | CoS CHARACTERISTIC NUMBER (6 BITS) | INPUT PHYSICAL PORT NUMBER (4 BITS) | OUTPUT DESTINATION PHYSICAL PORT NUMBER (4 BITS) | CoS (6 BITS) |
|---|---|---|---|---|---|
| 0 | 1 | 0 | 0 | 3 | 3 |
| 1 | 1 | 1 | 0 | 3 | 1 |
| 2 | 1 | 2 | 0 | 3 | 2 |
| 3 | 1 | 3 | 0 | 4 | 1 |
| 4 | 1 | 4 | 0 | 5 | 3 |
| 5 | 1 | 5 | 1 | 6 | 1 |
| 6 | 1 | 6 | 1 | 7 | 3 |
| 7 | 1 | 7 | 3 | 0 | 1 |
| 8 | 1 | 7 | 3 | 0 | 2 |
| 9 | 1 | 8 | 4 | 4 | 4 |
| 10 | 1 | 9 | 4 | 1 | 1 |
| 11 | 1 | 10 | 4 | 1 | 4 |
| 12 | 1 | 11 | 4 | 6 | 1 |
| 13 | 1 | 12 | 5 | 6 | 1 |
| 14 | 1 | 13 | 6 | 1 | 1 |
| 15 | 1 | 14 | 7 | 4 | 1 |
| 16 | 1 | 15 | 7 | 7 | 1 |
| 17 | 0 | | | | |
| 18 ... 31 | 0 | UNDEFINED | | | |

OF THE 32 TYPES, CHARACTERISTICS TOTAL 32
INDICATES VALIDITY OF SET CONTENTS

CONTENTS OF CAM AND SRAM DATA IN ONE EMBODIMENT

DIAGRAM OF ALLOCATION OF PACKET BUFFER MEMORY IN ONE EMBODIMENT

FIG. 13

| No. | PACKET LOSS | | ERROR INSERTION | | PACKET DUPLICATION | | DELAY INSERTION | |
|---|---|---|---|---|---|---|---|---|
| | EN | LOS FRACTION | EN | ERROR RATE | EN | DUPLICATION RATE | EN | DELAY TIME |
| 0 | 0 | – | 0 | – | 0 | – | 1 | 100ms |
| 1 | 0 | – | 0 | – | 0 | – | 1 | 1ms |
| 2 | 0 | – | 0 | – | 0 | – | 1 | 50ms |
| 3 | 0 | – | 1 | 10% | 0 | – | 0 | – |
| 4 | 0 | – | 1 | 20% | 0 | – | 1 | 100ms |
| 5 | 0 | – | 1 | 30% | 0 | – | 1 | 1ms |
| 6 | 0 | – | 1 | 40% | 0 | – | 1 | 300ms |
| 7 | 0 | – | 1 | 50% | 1 | 10% | 1 | 1ms |
| 8 | 0 | – | 1 | 50% | 1 | 10% | 0 | – |
| 9 | 1 | 10% | 1 | 50% | 1 | 10% | 1 | 800ms |
| 10 | 1 | 10% | 0 | – | 1 | 20% | 0 | – |
| 11 | 1 | 10% | 0 | – | 1 | 20% | 0 | – |
| 12 | 1 | 20% | 1 | 10% | 1 | 20% | 0 | – |
| 13 | 1 | 20% | 1 | 20% | 1 | 30% | 0 | – |
| 14 | 1 | 20% | 1 | – | 0 | – | 0 | – |
| 15 | 1 | 20% | 0 | – | 0 | – | 0 | – |
| 16 .. 31 | | | | UNDEFINED | | | | |

CONTENTS OF CoS CHARACTERISTIC TABLE IN ONE EMBODIMENT

FIG. 14

| No. | OUTPUT DESTINATION PHYSICAL PORT NUMBER | DEQ CoS NUMBER | START ADDRESS | END ADDRESS | CoS CHARACTERISTIC NUMBER |
|---|---|---|---|---|---|
| 0 | 0 | 0 | 0000000h | 01FFFFFh | 7 |
| 1 | 0 | 1 | 0200000h | 05FFFFFh | 7 |
| 2 | 1 | 0 | 0600000h | 07FFFFFh | 8 |
| 3 | 1 | 1 | 0800000h | 0EFFFFFh | 9 |
| 4 | 1 | 2 | 1000000h | 11FFFFFh | 12 |
| 5 | 1 | 3 | 1200000h | 13FFFFFh | 13 |
| 6 | 3 | 0 | 1400000h | 19FFFFFh | 0 |
| 7 | 3 | 1 | 1A00000h | 1AFFFFFh | 1 |
| 8 | 3 | 2 | 1C00000h | 1EFFFFFh | 2 |
| 9 | 4 | 0 | 2000000h | 21FFFFFh | 3 |
| 10 | 4 | 1 | 2200000h | 29FFFFFh | 7 |
| 11 | 4 | 2 | 2A00000h | 2AFFFFFh | 14 |
| 12 | 5 | 0 | 2C00000h | 31FFFFFh | 4 |
| 13 | 6 | 0 | 3200000h | 33FFFFFh | 5 |
| 14 | 6 | 1 | 3400000h | 35FFFFFh | 10 |
| 15 | 6 | 2 | 3600000h | 37FFFFFh | 11 |
| 16 | 7 | 0 | 3800000h | 3CFFFFFh | 6 |
| 17 | 7 | 1 | 3E00000h | 3EFFFFFh | 15 |
| 18 ⋮ 31 | | | UNDEFINED | | |

CONTENTS OF CONVERSION TABLE IN ONE EMBODIMENT

FLOWCHART OF OPERATIONS IN PACKET DELAY

FLOWCHART OF OPERATIONS IN PACKET ORDER INVERSION/
REROUTING

BUFFER MEMORY MANAGEMENT METHOD AND SYSTEM

BACKGROUND OF THE INVENTION

1. Field of the Invention

This invention relates to a method of management of buffer memory which stores packets in a network simulation device which simulates a device for performing packet exchange such as a router, and a buffer memory management system in a network simulation device using this method.

2. Description of the Related Art

In recent years the amount of traffic of data such as voice and images, which emphasize realtime response, on IP (Internet Protocol) networks has been increasing; and packet states such as packet delays and losses in routers, switches and other devices performing packet exchange in networks have greatly impacted the quality of communication and voice transmission experienced by end users.

Hence there has been a need to perform simulations of network quality, using settings to simulate the creation of various packet states in networks.

Buffer memory (hereafter called "packet buffers" for convenience) which stores packets is used in routers, switches and other devices performing packet exchange in networks. These packet buffers are used to temporarily store received packets, and to send the packets according to prescribed rules.

Hence devices used in the above simulations of network quality must also comprise packet buffers, in order to temporarily store packets and control packet transfer according to preset processing. Through the management of such packet buffers, various packet processing can be simulated.

In conventional packet buffer management, packets are stored in a packet buffer in which fixed areas are allocated according to the results of identification of the header portion of packets received from the network, and transfer is performed according to preset packet characteristics. (See for example FIG. 14 in Japanese Patent Laid-open No. 2001-143702.)

FIG. 17 is a block diagram of the configuration of a device equivalent to a router, which constitutes a network, employing the packet buffer described in this patent application; the operation of this device is explained below.

In the multiplexing portion 1 in the drawing, Ethernet signals of a plurality of n ports are multiplexed. The packet type identification control portion 2 compares the IP address or other identification information in the header portion of a packet multiplexed by the multiplexing portion 1 with registered information, referring to associative memory (CAM: Content-Addressable Memory) 3. When comparison results in a match, tag information identifying the service class (CoS: Class of Service) as classified by the TCP/UDP port number or similar is read from the SRAM 4 and appended to the packet, which is output.

The buffer management control portion 5 manages the writing to and reading from the packet buffer memory 6 of packets to which tag information input from the packet type identification control portion 2 is appended. The packet pointer management memory 7 manages the address pointer specifying address positions at which packets are stored in the packet buffer memory 6.

The above buffer management control portion 5 has a service class (CoS) characteristic table 8; in this service class characteristic table 8 are stored, for identified packets, the packet delay, packet loss, packet order inversion, or error insertion or other characteristic content to control operation.

The buffer management control portion 5 further has a read/write control portion 9, which performs read/write control of the packet buffer memory 6; a pointer read/write control portion 10, which specifies the address in the packet buffer memory 6 during read and write operations by the packet read/write control portion 9, based on the storage address of a packet stored in the packet pointer management memory 7; and a packet output control portion 11, which controls packet output from the packet buffer memory 6 according to the CoS characteristic set in the service class characteristic table 8.

The demultiplexing portion 12 has a function to separate multiplexed packets into n ports.

FIG. 18 shows the configuration of the packet buffer memory 6 in FIG. 17. The CoS number [of services] (1) for the output destination physical port numbers 1 to n, and (2) for each physical port (in the example of the drawing, 8 types) are fixed values. Further, (3) the CoS number is specified for output destination physical ports, and the amount of memory allocated to each CoS area for all physical ports is uniform and fixed. And, (4) start addresses and end addresses for each CoS area are fixed.

Storage addresses for packets in the packet pointer management memory 7 are stored so as to result in the configuration of packet buffer memory 6 shown in FIG. 18. Hence the read/write control portion 9 reads and writes a packet identified by the packet type identification control portion 2 to and from an address position read from the packet pointer management memory 7 and specified by the pointer read/write control portion 10.

Thus as described above, in the conventional configuration shown in FIG. 17, storage areas in the packet buffer memory 6 are fixed as shown in FIG. 18.

Further, in the pointer read/write control portion 10 in the conventional configuration shown in FIG. 17, the amount of movement of the management pointer by the packet output control portion 11 according to the service class characteristic table is always fixed, so that no means is provided to enable various packet operations in a simulated network.

In conventional packet buffer management as shown in FIG. 17 and FIG. 18, memory areas allocated to each physical port or CoS area are fixed. Consequently when there is a small number of physical ports or CoS areas being used, there occur memory areas in the packet buffer memory 6 which are not used at all.

Also, when a delay is added to a transferred packet, the maximum delay time which can be set is determined by the fixed area size regardless of the number of physical ports or the number of CoS areas, and delay times cannot be set making maximum use of memory resources.

Further, in the conventional buffer management method the amount of movement of the management pointer-based on settings in the service class characteristic table 8 is fixed, so that it is not possible to perform processing necessary for substitution of the order of transfer of packets in the packet output control portion 11, for intentional loss of arbitrary packets, or to otherwise simulate network operation.

SUMMARY OF THE INVENTION

Hence an object of this invention is to provide a packet buffer management method and system which, compared with conventional packet buffer management methods, enable maximum utilization of buffer memory hardware resources, and are optimal for the preset number of physical ports used and number of CoS areas.

A further object of this invention is to enable excellent processing performance of various packet operations through comparatively simple hardware.

To accomplish the above objects of the present application:

a first feature of the invention is a buffer memory management method in a packet transmission/reception device, for storing received packets in a buffer memory and controlling writing and reading of packets to and from said buffer memory, including the steps of: setting in units of the service class included in a header portion of a received packet, a control method for the received packets; and, modifying allocated areas for each service class in said buffer memory storing received packets according to the number of said service classes setting.

a second feature of the invention is a buffer memory management method according to the first feature 1, wherein the control method for the received packets includes delay for the packet, packet loss, packet order inversion, or error insertion, and the service classes are classified by an IP address or TCP/UDP port number comprised by the header portion of the packet.

a third feature of the invention is a packet buffer management system, including a buffer memory to store received packets; a control portion to control writing and reading of packets to and from said buffer memory; a service class characteristic table in which are set control methods for packets corresponding to service classes included in header portions of the received packets; and a conversion portion in which are stored allocated areas of the buffer memory corresponding to service classes, wherein the conversion portion modifies the allocated areas of the buffer memory according to the number of service class settings in the service class characteristic table.

a fourth feature of the invention is the packet buffer management system according to claim 3, wherein, in the conversion table, buffer memory allocation areas are in service class units.

a fifth feature of the invention is the packet buffer management system according to the third feature, further including a management memory to store transfer pointers indicating the storage position of packets stored in the packet buffer and time stamp values indicating the time at which packets are stored, wherein the control portion performs control of received packets based on packet existence information and the time stamp values within the packet buffer, and based on the control method set in the service class characteristic table.

A sixth feature of the invention is the packet buffer management system according to the fifth feature, wherein, as a control method of the control portion, received packet order inversion and router path modification are performed by moving the transfer pointer based on said time stamp value.

a seventh feature of the invention according to the third feature, wherein operations to store packets in the buffer memory, packet registration operations, transfer pointer read operations, and packet transfer analysis operations are each performed in parallel.

a eighth feature of the invention is the packet buffer management system according to the fifth feature, further including means for storing in said management memory the time of packet storage in the packet buffer as the time stamp, and for judging whether the packet can be transferred by comparing said time stamp with the reference time within the device at the time of packet transfer analysis, wherein when a preset delay time has not elapsed, said time stamp is stored in a time stamp buffer provided in service class units, and in subsequent transfer analysis the time stamp within the time stamp buffer is compared with the reference time.

Features of this invention will be further clarified through aspects of the invention, explained with reference to the drawings.

BRIEF DESCRIPTION OF THE DRAWINGS

FIG. 3 shows the contents of the conversion table 13;

FIG. 5 shows one example of settings of a service class characteristic table;

FIG. 10 is a detailed block diagram of the packet identification control portion 2;

FIG. 11 shows the data contents of the CAM 3 (FIG. 11A) and the SRAM 4 (FIG. 11B);

FIG. 13 shows the contents of the service class 20: characteristic table 8;

FIG. 14 shows the content of the conversion table 13;

DESCRIPTION OF THE PREFERRED EMBODIMENTS

Below, aspects of the invention are explained.

Figure 1:
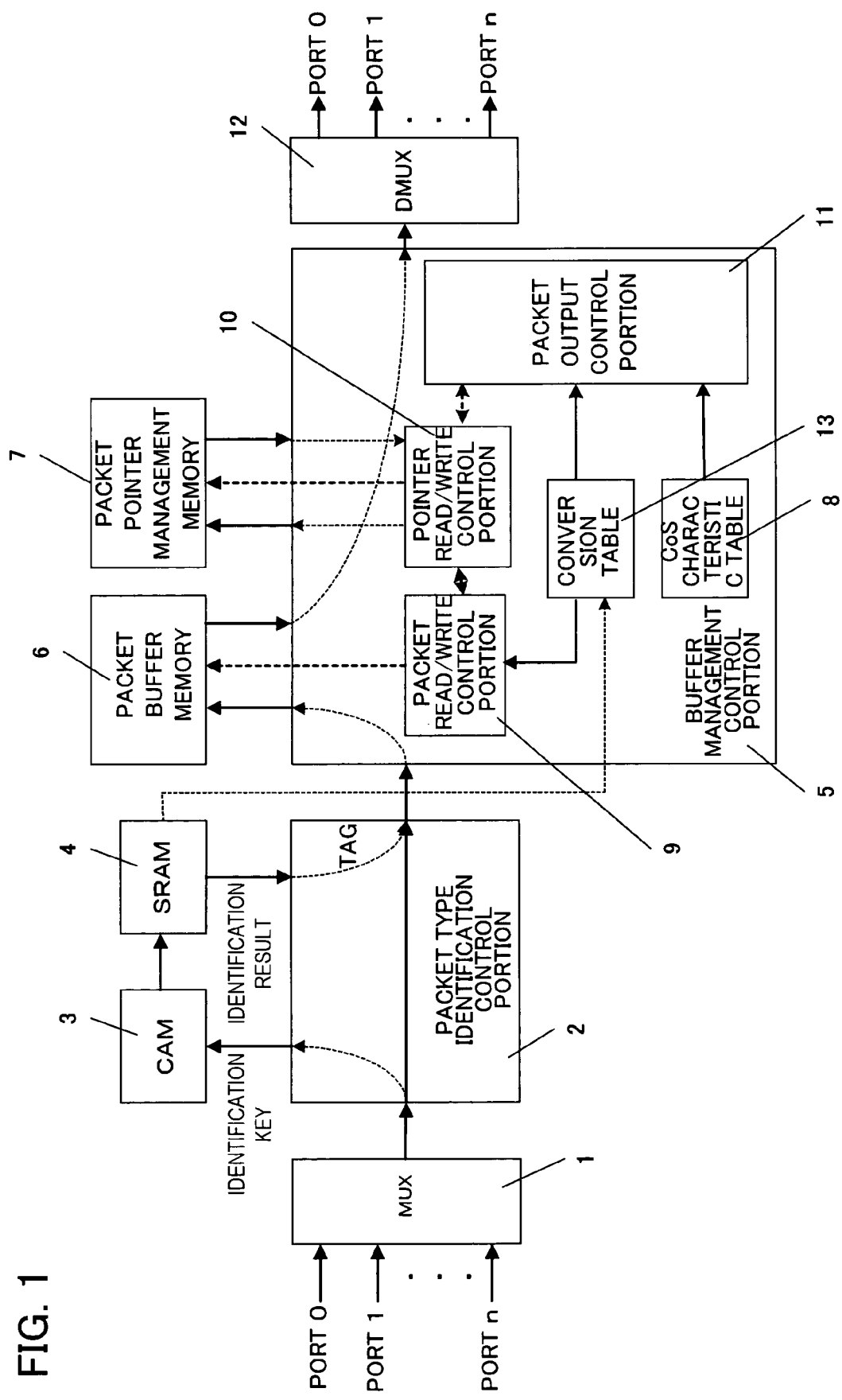
FIG. 1 is a block diagram of an aspect of a simulation device to simulate network quality, to which a buffer management method of this invention is applied.

FIG. 1 is a block diagram of an aspect of a simulation device to simulate network quality, to which a buffer management method of the present invention is applied. In comparison with the conventional configuration shown in FIG. 17, the simulation device of the present invention has the feature of including a conversion table 13.

In the following explanations, it is assumed that there are 0th through nth network physical ports, 0 through N IP addresses for CoS identification, and 0 through M types of CoS characteristics.

In FIG. 1, the multiplexing portion 1 multiplexes the Ethernet signals of a plurality n of ports. The packet type identification control portion 2 has CAM 3 and SRAM 4, and compares the IP address or other identification information in the header portion of a packet multiplexed by the multiplexing portion 1 with registered information, referring to the associative memory (CAM: Content Addressable Memory) 3.

When comparison results in a match, tag information identifying the service class (CoS: Class of Service), into which the packet is classified by the TCP/UDP port number or similar is read from the SRAM 4 and appended to the packet, which is output.

Figures 2A, 2B:
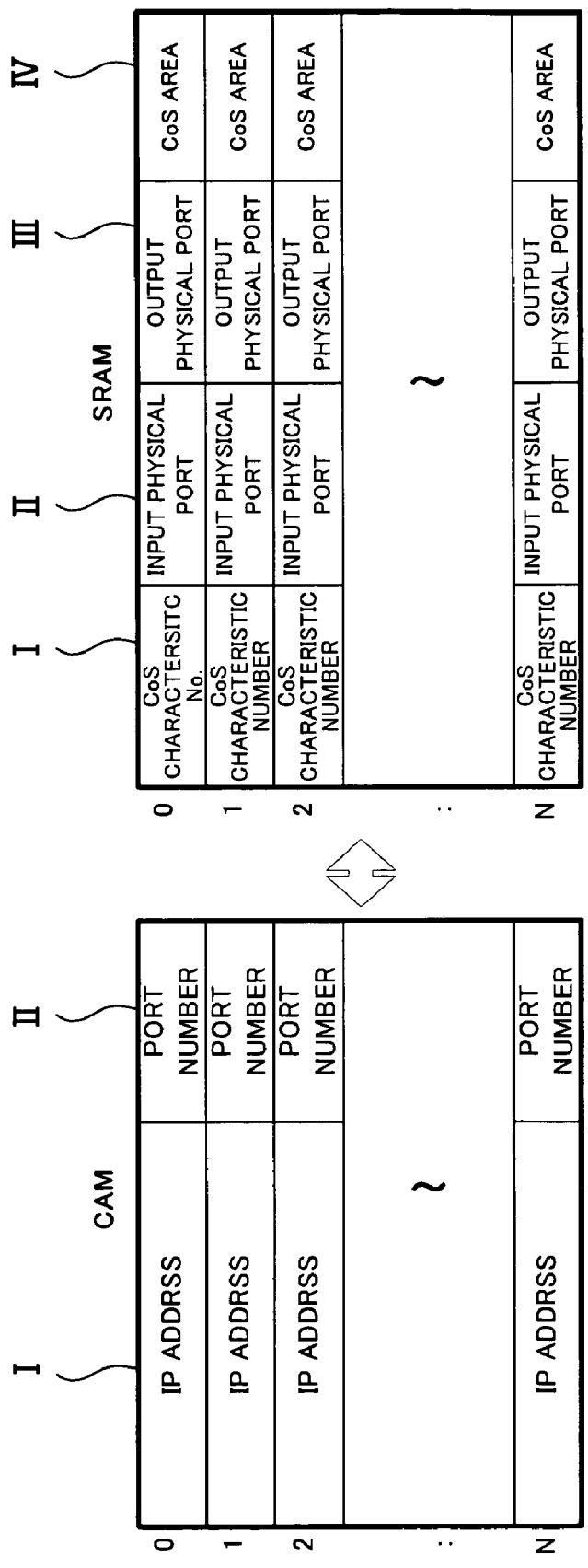
FIG. 2 shows the data configuration of CAM and SRAM.

The data configuration of the CAM 3 and SRAM 4 is shown in FIG. 2. In the data configuration of the CAM 3 in FIG. 2A, the (I) IP address and (II) port number which are to be identified are registered in association.

In the data configuration of the SRAM 4 shown in FIG. 2B, the (I) CoS characteristic number, (II) input physical port, (III) output physical port, and (IV) CoS area are associated, corresponding to the order of IP addresses in the CAM 3. Here (I) the CoS characteristic number is the number of the service class characteristic table in which the characteristic contents are set; (II) the input physical port is the physical port for input; (III) the output physical port is the physical port for output; and (IV) the CoS area is the CoS area (capacity) allocated in the packet buffer memory 6; these are registered as a set.

Hence the packet type identification control portion 2 judges whether the information in the header portion of a packet input from the multiplexing portion 1 matches an IP address or port number registered in the CAM 3. If there is a match, the above corresponding information (I) through (IV) from the SRAM 4 is output as tag information and is appended to the input packet, which is sent to the buffer management control portion 5.

Figure 17:
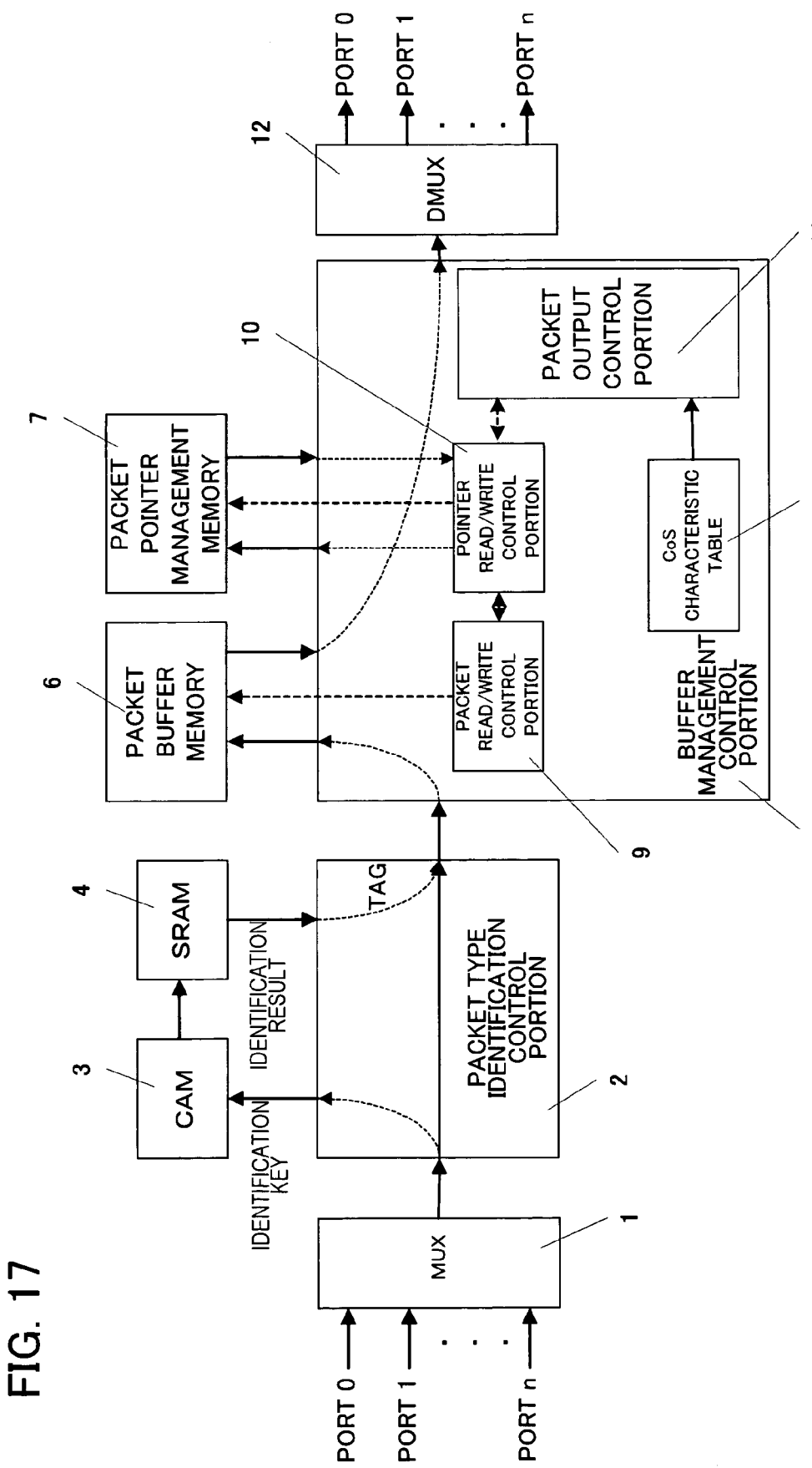
FIG. 17 is a block diagram of the configuration of a device equivalent to a router comprised by a network employing a packet buffer; and, FIG. 18 shows the configuration of the packet buffer memory 6 in FIG. 17.
Figure 18:
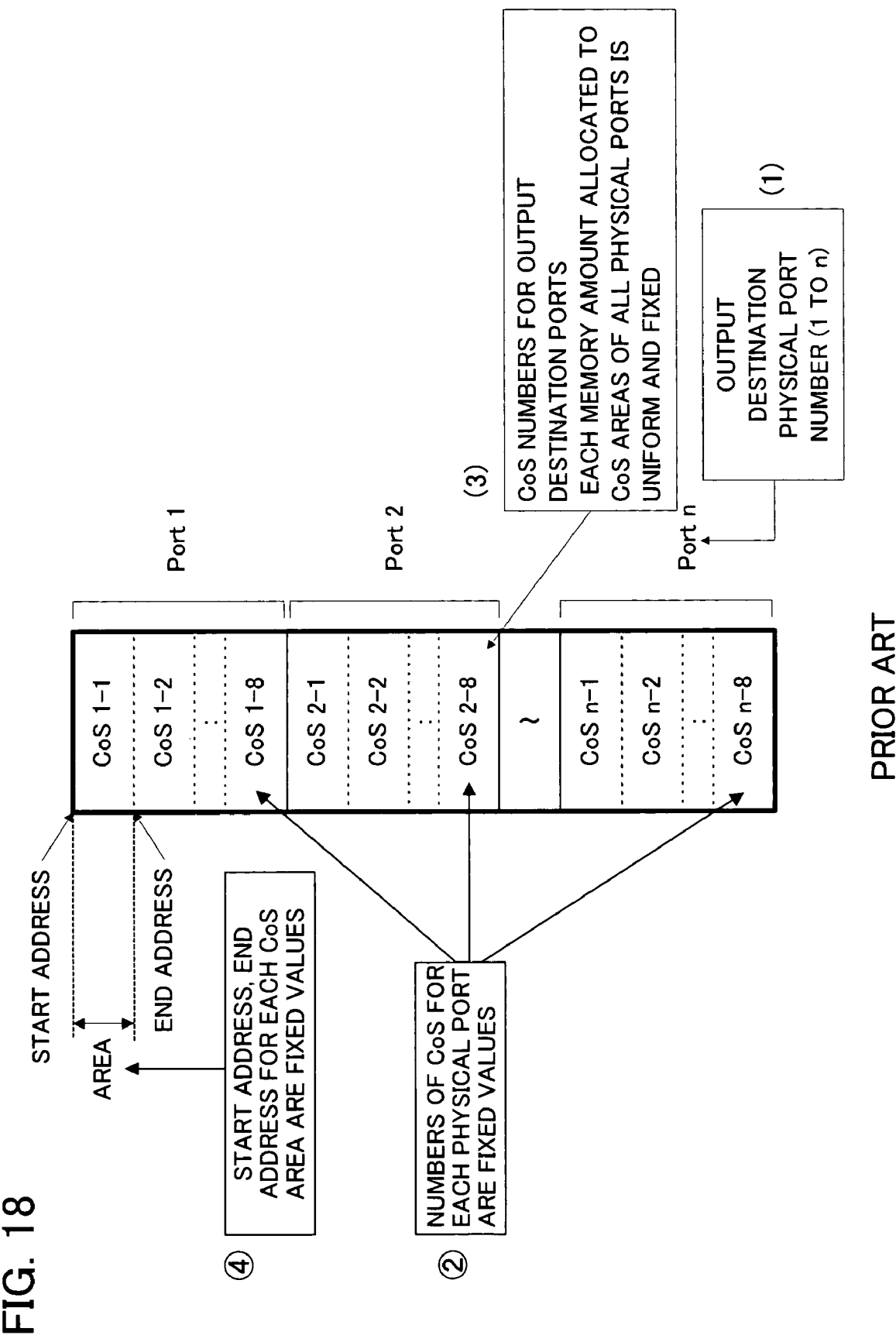

The buffer management control portion 5 further has a conversion table 13, in contrast with the conventional configuration explained in FIG. 17.

The contents of the conversion table 13 are shown in FIG. 3. Output physical ports 0 through M are defined ((1)) in the conversion table 13 corresponding to the output physical ports (III) based on the content set in SRAM 4 in FIG. 2B; on the basis of this, areas in the packet buffer memory 6 are allocated ((2), (3), (4)), and combinations with CoS characteristic numbers 0 through M ((5)) are created. In allocating the areas of the packet buffer memory 6, the CoS areas are exchanged with the start addresses ((3)) and end addresses ((4), (2)) of the packet buffer memory 6.

Figure 4:
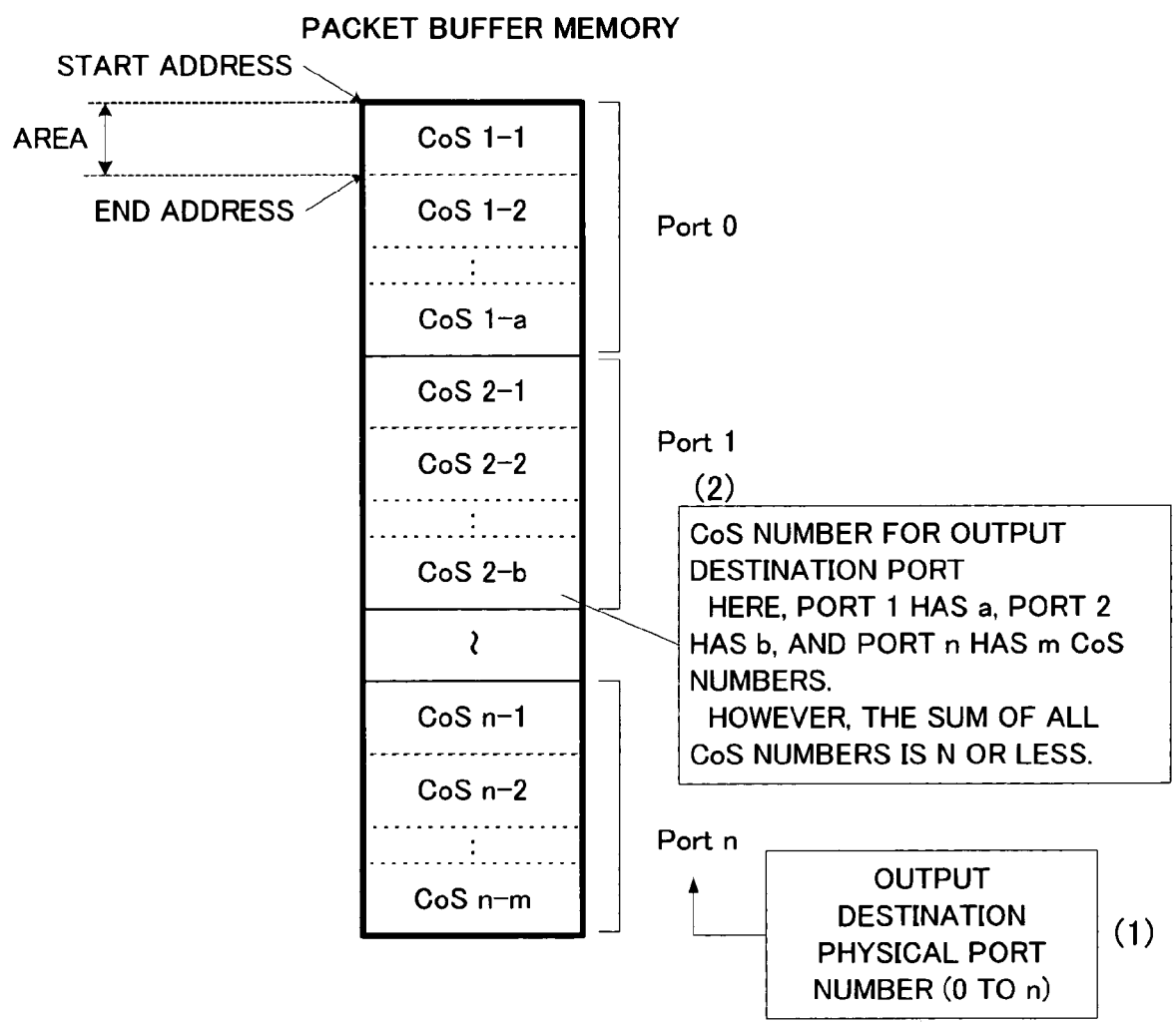
FIG. 4 shows the configuration of the packet buffer memory 6.

By this means, the packet buffer memory 6 is configured as shown in FIG. 4. In FIG. 4, (2) CoS numbers are allocated to (1) output physical port numbers 0 through n. In the example of FIG. 4, port 1 has a CoS numbers, port 2 has b CoS numbers, and port n has m CoS numbers. However, each of the CoS numbers corresponds to an IP address for identification, so that in FIG. 4 the sum of the CoS numbers (a+b+ . . . +m) is N or less.

Here, the user performs the following settings in advance for network simulation.

First, the characteristic to be applied to the packet is set in the service class characteristic table 8, as shown in FIG. 5. CoS characteristics having 0 to M packet control operations are defined.

Second, as previously shown in FIG. 2A, IP addresses or TCP/UDP port numbers are specified for CoS identification, based on the receiving-side port, in the CAM 3.

Third, as previously shown in FIG. 2B, for each of 0 through N IP addresses, that is, for each CoS, a CoS characteristic number (I) indicating the characteristic to be applied, an input physical port (II), an output destination physical port number (III), and the amount of buffer area (CoS area) (IV) of the packet buffer memory 9 to be secured, are specified in SRAM 4 (see IV in FIG. 2B).

On the other hand, as previously indicated in FIG. 3, in the conversion table 13 on the side of the buffer management control portion 5, the contents of the SRAM 4 are rearranged based on the output physical port, and allocation of the packet buffer memory 9 is performed. At this time, the start address and end address of each CoS area are determined.

Figure 6:
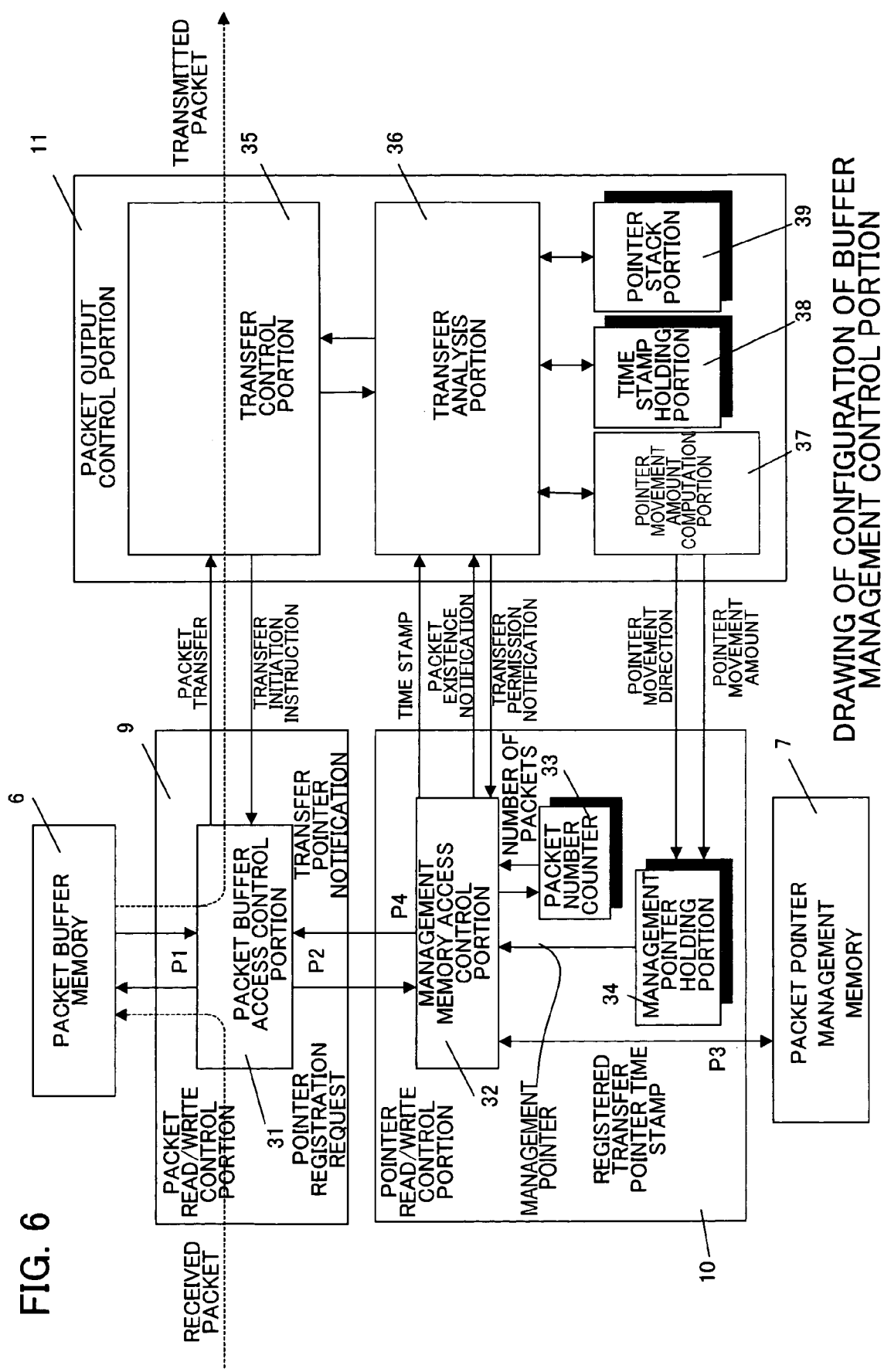
FIG. 6 shows in detail the configuration of the buffer management control portion 5 in FIG. 1, excluding the conversion table 13 and service class characteristic table 8.

FIG. 6 shows in further detail the configuration of the buffer management control portion 5 in FIG. 1, excluding the conversion table 13 and service class characteristic table 8.

In FIG. 6, the packet number counter 33 of the pointer read/write control portion 10 indicates, in CoS units, the number of packets stored in the packet buffer memory 6. The management pointer holding portion 34 indicates the management pointer position of the packet pointer management memory 7, in CoS units.

The transfer control portion 35 of the packet output control portion 11 is provided with a sequencer which controls the transfer of packets read from the packet buffer memory 6. The transfer analysis portion 36 judges whether packet transfer is possible, according to settings related to packet processing.

The management pointer movement amount computation portion 37 computes the amount of pointer movement according to the transfer judgment of the transfer analysis portion 36. The time stamp holding portion 38 stores the time stamp value read from the packet pointer management memory 7 when a packet delay operation is performed; and the pointer stack portion 39 is used to temporarily store the management pointer value for a stack for transfer later, when packet order inversion/rerouting operations are performed.

In FIG. 6, the packet read/write control portion 9 has a packet buffer access control portion 31. When a packet, to which a CoS characteristic has been appended as tag information, is transferred from the packet type identification control portion 2, the packet is stored in the packet buffer memory 6 by the packet buffer access control portion 31.

After storage in the packet buffer memory 6, the transfer pointer indicating the storage address is, together with the time stamp, registered in the packet pointer management memory 7 via the management memory access control portion 32.

The number of packets stored in the packet buffer memory 6 in CoS units is recorded in the packet number counter 33. Based on the value of this packet number counter 33, the management memory access control portion 32 notifies the transfer analysis portion 36 of the packet output control portion 11 of the fact that there exist transferable packets in the packet buffer memory 6.

Further, the transfer analysis portion 36 determines, based on this notification of the existence of transferable packets and the preset-CoS characteristics, whether packet transfer is possible or not, and the direction and amount of movement of the management pointer held in the management pointer holding portion 34.

As a result of this analysis, control of the transfer of packets in the packet buffer memory 6 and control of movement of the management pointer for the packet pointer management memory 7 are executed. Through these operations, various packet operations can be controlled.

Figure 7:
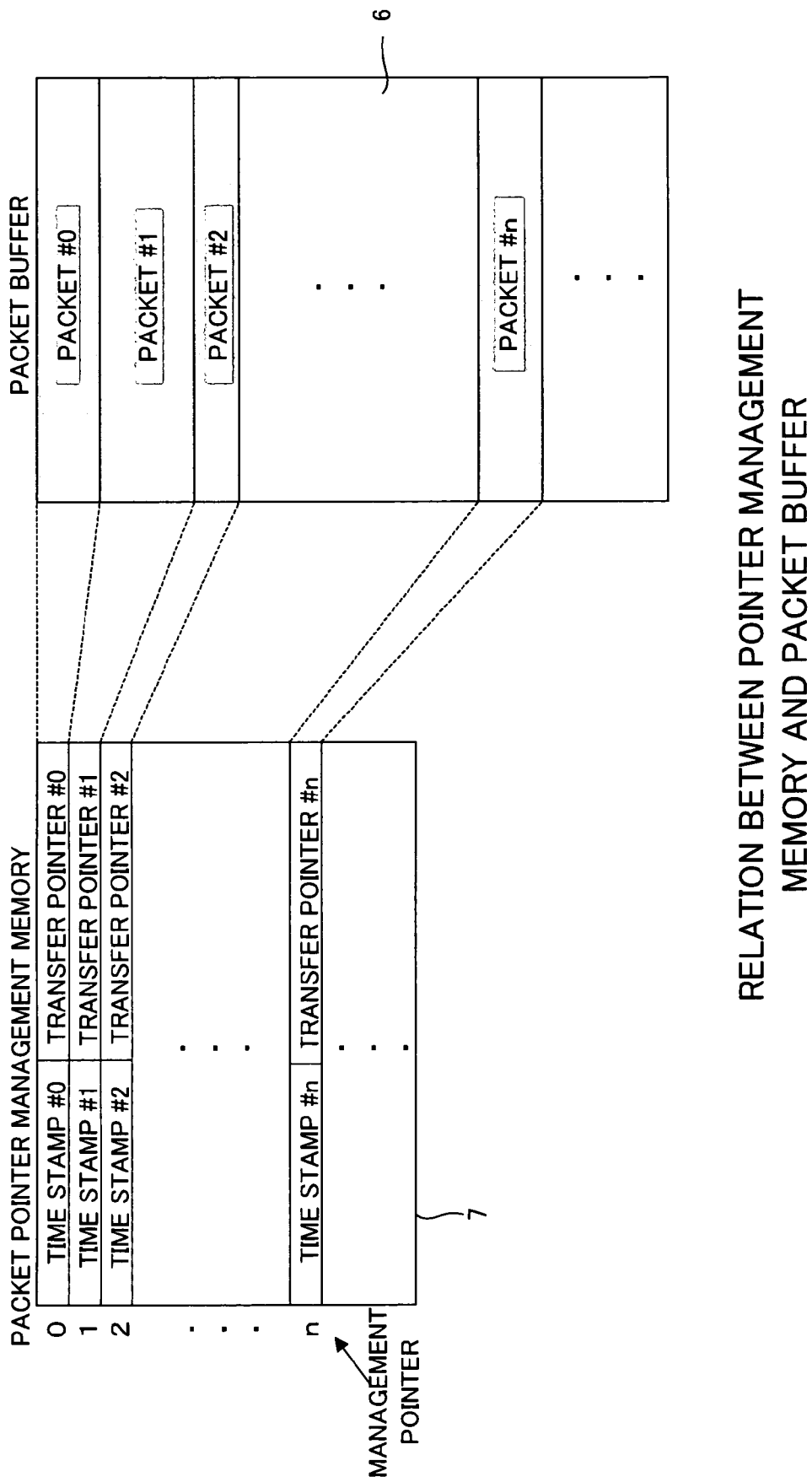
FIG. 7 shows the correspondence relation between each of the packets stored in the packet buffer memory 6 and the packet pointer management memory 7.

FIG. 7 shows the correspondence relations between each of the packets stored in the packet buffer memory 6 and the packet pointer management memory 7. As shown in FIG. 7, each entry (indicated by a time stamp number and transfer pointer number) specified by the management pointer of the packet pointer management memory 7 is associated with a packet within the packet buffer memory 6 in a one-to-one relationship.

The following is a summary explanation of packet operation control using the above configuration.

Returning to FIG. 1, packets input from the network via ports 0 through n are multiplexed by the multiplexing portion 1. Multiplexed packets are sent to the packet identification control portion 2.

In the packet identification control portion 2, an IP address or TCP/UDP port number or similar is extracted from the header of a received packet, and a search performed to determine whether there is a match with an IP address or TCP/UDP port number set in advance in the CAM 3, to judge whether or not the packet currently being received is a CoS packet.

When there is a match with an IP address or TCP/UDP port number set in advance in the CAM 3, the corresponding information in SRAM 4 (see FIG. 2B) is read. The information thus read is appended to the beginning of the packet as tag information, and the packet is passed to the buffer management control portion 5.

In the conversion table 13, as previously explained, the contents of the SRAM 4 shown in FIG. 2B are converted, based on the output physical port, into the order CoS number, storage area in the packet buffer memory 6 specified by the start and end addresses, and CoS characteristic number.

In the buffer management control portion 5, an address for writing to packet buffer memory 6 is generated by the packet read/write control portion 9 for a received packet, referring to tag information and the conversion table 13, and control of writing to the packet buffer memory 6 is performed.

When writing is completed, a request for registration in the packet pointer management memory 7 is passed, together with the packet leading address, to the pointer read/write control portion 10. The pointer read/write control portion 10, upon receiving the registration request, writes the packet leading address to the packet pointer management memory 7.

In the packet output control portion 11, in order to execute characteristics set for each CoS according to the contents of the conversion table 13, the area of the packet stored in the packet buffer memory 6 to be read, the order, time and other management is performed, and a read request is issued to the pointer read/write control portion 10 for the CoS for reading.

In the pointer read/write control portion 10, the CoS transfer pointer for which a read request has been issued is read from the packet pointer management memory 7, and the packet read request, together with the packet transfer pointer (leading address), is passed to the packet read/write control portion 9.

In the packet read/write control portion 9, the packet is read from the packet buffer memory 6 at the received transfer pointer, and the packet thus read is sent to the demultiplexing portion 12. In the demultiplexing portion 12, the packet is separated into output ports, and output to the network at ports 0 to n.

Figure 8:
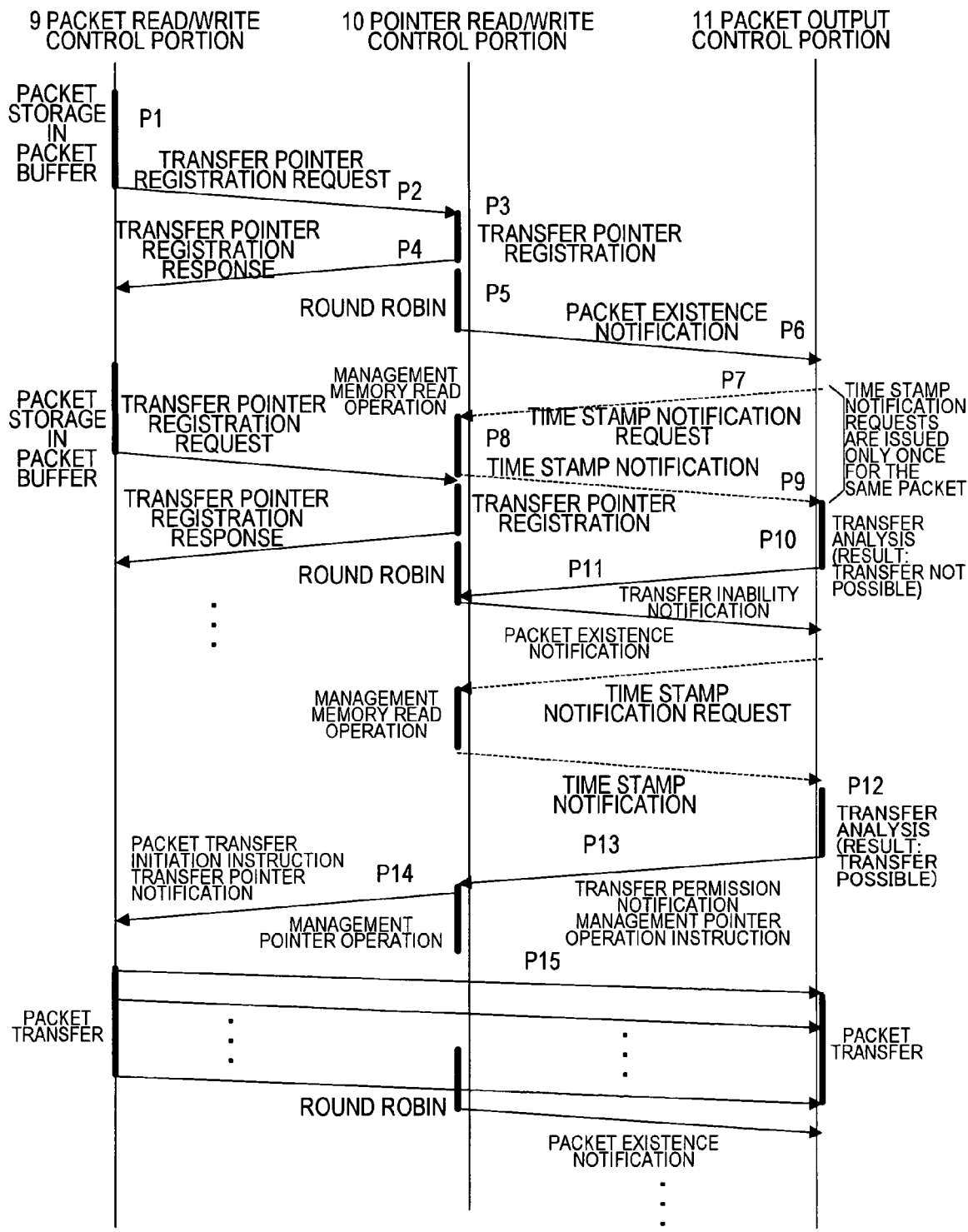
FIG. 8 shows the operation sequence of the buffer management control portion 5.

Here detailed operation of the buffer management control portion 5 is explained based on the operation sequence of the buffer management control portion 5 of FIG. 8, and referring to the drawing of the configuration of the buffer management control portion 5 in FIG. 6.

When packet storage in the packet buffer memory 6 is controlled (in process P1) by the packet read/write control portion 9, a transfer pointer registration request is sent to the pointer read/write control portion 10 (process P2).

The transfer pointer is registered in packet pointer management memory 7 (process P3) according to this registration request, and a transfer pointer registration response is returned to the packet read/write control portion 9 (process P4).

Here, when there is transfer pointer registration in a plurality of CoS areas, a packet for transfer analysis is determined by a round robin method. Then, notification of packet existence is sent to the transfer analysis portion 36 of the packet output control portion 11 (process P6). The CoS number is contained in the packet existence notification, so that transfer pointers are registered in the pointer stack portion 39 for each Cos.

When a packet existence notification is received, a time stamp notification request is sent from the packet output control portion 11 (process P7). The pointer read/write control portion 10, on receiving the time stamp notification request, reads from the packet pointer management memory 7 the corresponding time stamp registered together with the transfer pointer, as shown in FIG. 7 (process P8), and sends [the time stamp] to the packet output control portion 11 (process P9). The time stamp sent in this way is held by the time stamp holding portion 38 together with the CoS number appended to the previously sent packet existence notification.

In the transfer analysis portion 36 of the packet output control portion 11, transfer analysis is performed (process P10). In transfer analysis in the transfer analysis portion 36, the ability or inability to transfer the packet, whether an error is to be inserted or other processing performed, and similar are decided, based on the packet CoS characteristic and the time stamp value.

Cases when, as a result of transfer analysis, it is judged that transfer is not possible, are cases in which, in packet delay control, the delay amount between the device internal time and the time stamp is less than a prescribed delay control amount.

When transfer is not possible, a transfer inability notification is sent to the pointer read/write control portion 10 (process P11). As the result of transfer analysis at other times (process P12), in the case of packets which can be transferred, a management pointer operation instruction is sent to the pointer read/write control portion 10 (step P13), and a transfer initiation instruction is issued to the packet read/write control portion 9 (process P14). Based on these actions, the packet is read from the packet buffer memory 6 by the packet read/write control portion 9, and is transferred to the packet output control portion 11 (process P15).

Figure 9:
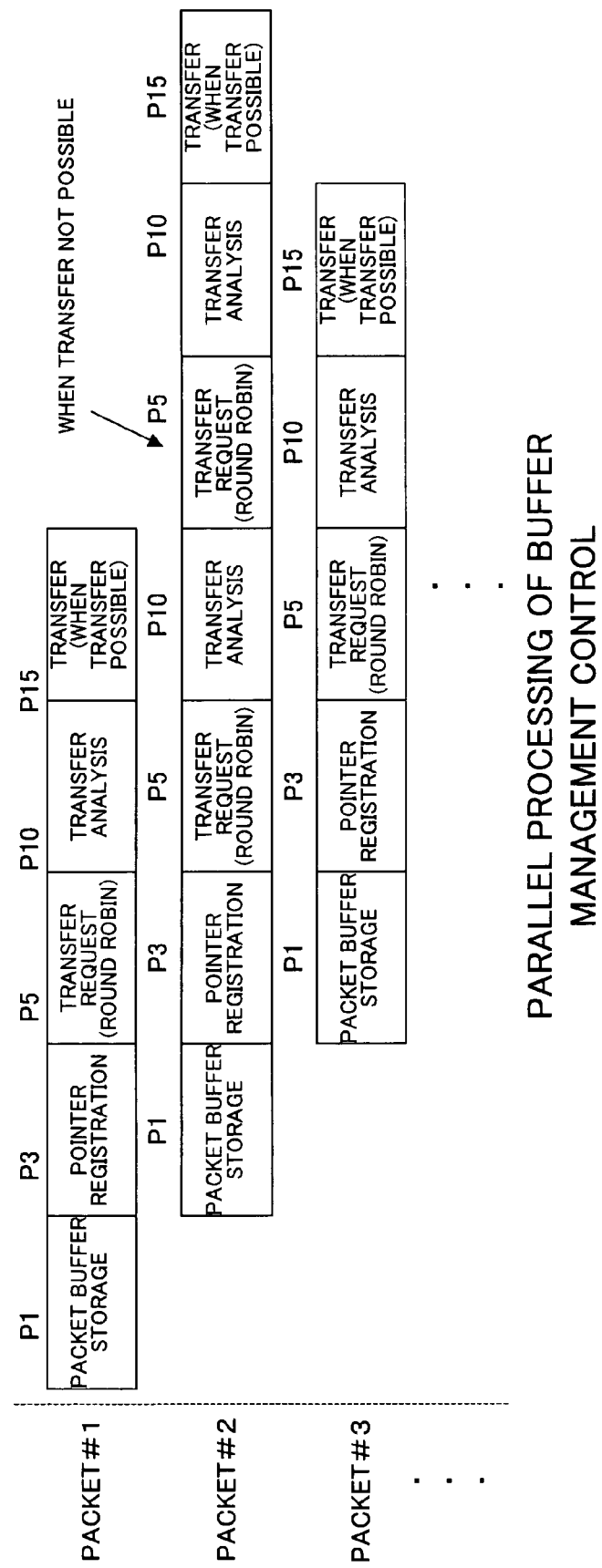
FIG. 9 explains the parallel processing in FIG. 8.

The processing of FIG. 8 is performed in parallel, as shown in FIG. 9. Hence the bandwidth of the bus within the device can be used efficiently, and adequate performance can be secured even when packets which impose a heavy load are input from the network.

Next, a specific embodiment of this invention is explained. As an embodiment of this invention, FIG. 10 is a detailed block diagram of the packet identification control portion 2, FIG. 11 shows the data contents of the CAM 3 (FIG. 11A) and SRAM 4 (FIG. 1B), FIG. 12 shows the allocation of packet buffer memory 6, FIG. 13 shows a service class characteristic table 8, and FIG. 14 shows the contents of a conversion table 13.

In the following explanation of a specific example, the number of physical ports is assumed to be 8 (0 to 7), the maximum number of CoS identifications is 32, and the maximum number of CoS characteristic numbers is 32.

As shown in FIG. 11, in this embodiment 18 CoS identifications are performed, out of a maximum 32 CoS identifications. Overall, 16 types (CoS characteristic numbers 0 to 15) of CoS characteristics are allocated. In the unused area of SRAM 4 (FIG. 1B), by setting EN bits to "0", [the fact that the area is unused] can be judged.

All CoS characteristic numbers 7 are allocated to the input physical port number 3. Thus in the example shown in FIG. 11, the same CoS characteristic is applied to a plurality of IP addresses and TCP/UDP port numbers (FIG. 11A).

Figures 12A, 12B:
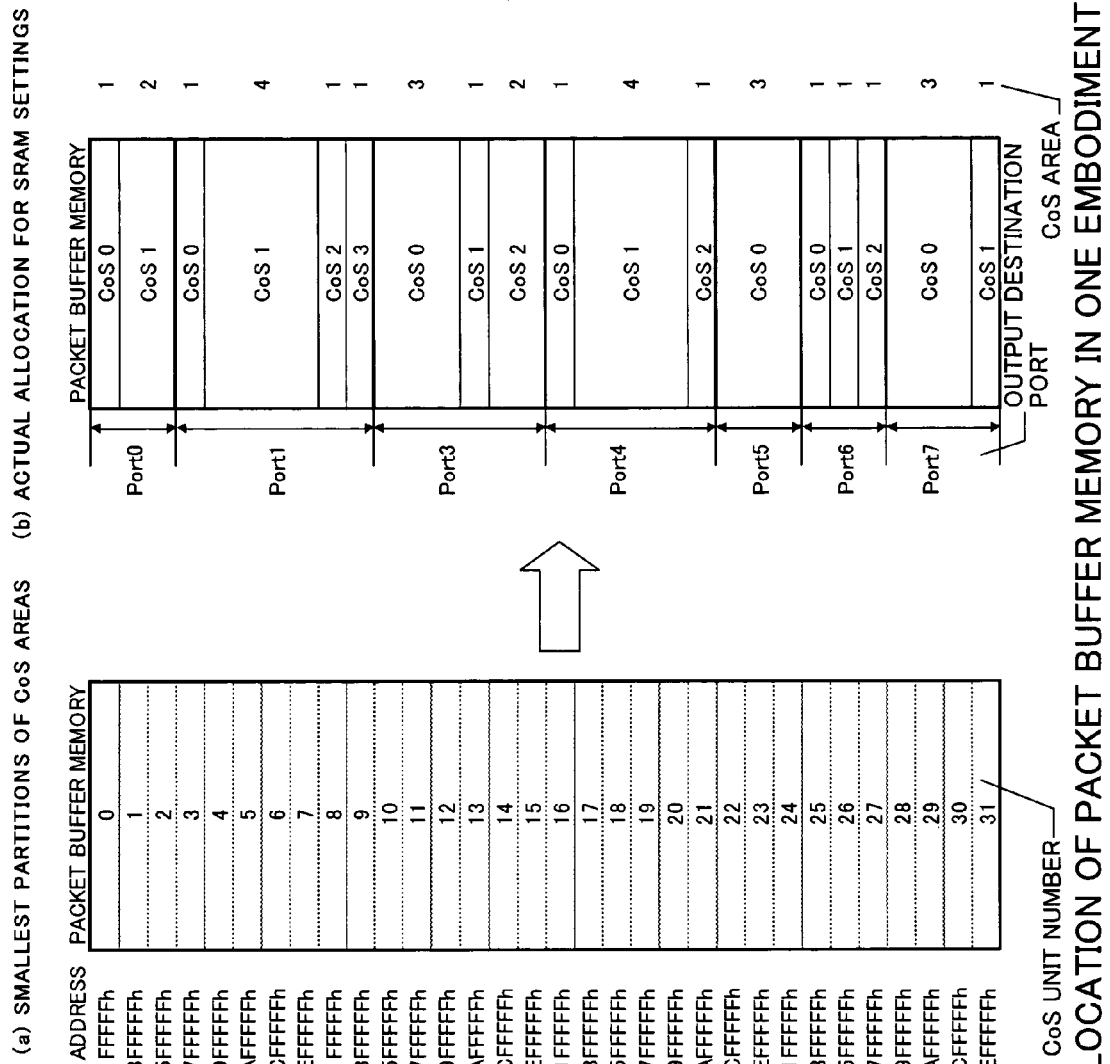
FIG. 12 shows the allocation configuration of the packet buffer memory 6.

As shown in FIG. 12A, allocation of the packet buffer memory 6 is performed by dividing the packet buffer memory 6 in advance into 32 fixed areas. Further, these may be the smallest CoS areas, and the CoS areas of the SRAM 4 may be allocated numerically.

At this time, by uniquely assigning start addresses and end addresses for the start address and end address of each smallest CoS area (CoS unit), as shown in FIG. 12A, a CoS area specified by the user and an address in the packet buffer memory 6 can be allocated uniquely.

In this embodiment, the configuration of the allocated packet buffer memory 6 is as shown in FIG. 12B.

For example, consider a packet which matches the address 6 (IP address 7, port number 7) in the CAM 3 in FIG. 11A. From the data contents of the SRAM 4 in FIG. 11B and the contents of the service class characteristic table 8 of FIG. 13, if the IP address and TCP/UDP port number of the packet input from physical port number 1 are respectively "IP address 7" and "port number 7", then the CoS characteristic number 6, that is, error input with an error occurrence rate of 40% and 300 ms delay insertion are performed simultaneously.

The area 3800000h to 3CFFFFFh is allocated to the packet buffer memory 6 (see FIG. 12: port number 7, CoS area 3).

By securing a broad allocation area for packets with long delay times inserted, as in this embodiment, delay times can be set freely.

The operation of this embodiment is explained below.

In the detailed block diagram of the packet identification control portion 2 in FIG. 10, the CPU IF portion 21 has the functions of an interface with a CPU, not shown. The packet transfer control portion 22 performs packet input and output and generates timing signals. The header extraction portion 23 extracts the IP address or TCP/UDP port number from an input packet. The mask portion 24 masks the IP address and TCP/UDP port number. The CAM 3 has the size of 32 words×288 bits. The SRAM 4 has the size of 32 words×21 bits. The tag latch control portion 25 generates tag information and sends [the tag information] to the tag latch circuit 26. The selector 27 is a circuit which selects whether to output a tag or to output an input packet.

In a packet identification control portion 2 with such a configuration, the IP address is extracted from the input packet data by the IP address extraction portion 23, mask processing is performed by the mask portion 24, and together with the TCP/UDP port number and similar, the IP address is input to the CAM 3.

Here, mask processing is processing to apply a filter in order to specify an IP range. In this embodiment, this is achieved by setting the specified bits to "1" according to the settings from the CPU.

At this time, bits to be masked must be similarly set to "1" for the CAM 3 also. As with IP address masking, for the CAM 3, all "1"s are set to for TCP/UDP port numbers, and when TCP/UDP port number searches are not performed the port number is masked with all "1"s and input to the CAM 3. By this means matches can be detected only for IP addresses, for IP addresses and TCP/UDP port numbers, or for TCP/UDP port numbers only.

As a result of a search in the CAM 3, if a matching IP address and TCP/UDP port number exist, the corresponding data in SRAM 4 is read. If the input physical port set in the read data matches the input physical port of a packet currently being received, and if the EN bit is "1", then a tag is generated for the packet as a packet to be identified, the tag is appended to the beginning of the packet, and the packet is passed to the buffer management control portion 5.

The input physical port, output physical port, EN information and similar are inserted into the tag, which is used to generate the write address in the packet buffer memory 6 by the buffer management control portion 5.

Figure 15:
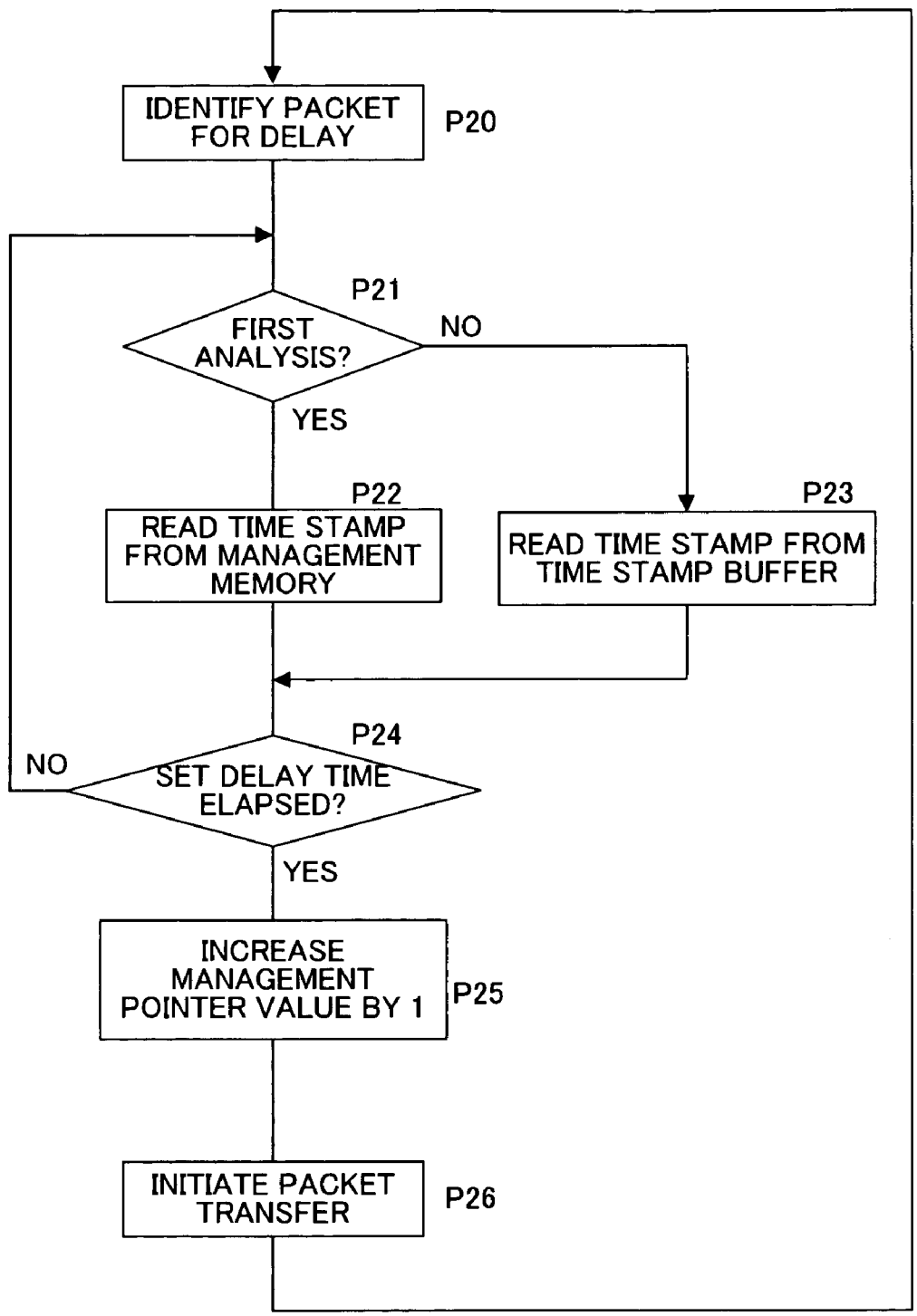
FIG. 15 shows the processing flow when packet delays are caused, as an embodiment of packet operation control.
Figure 16:
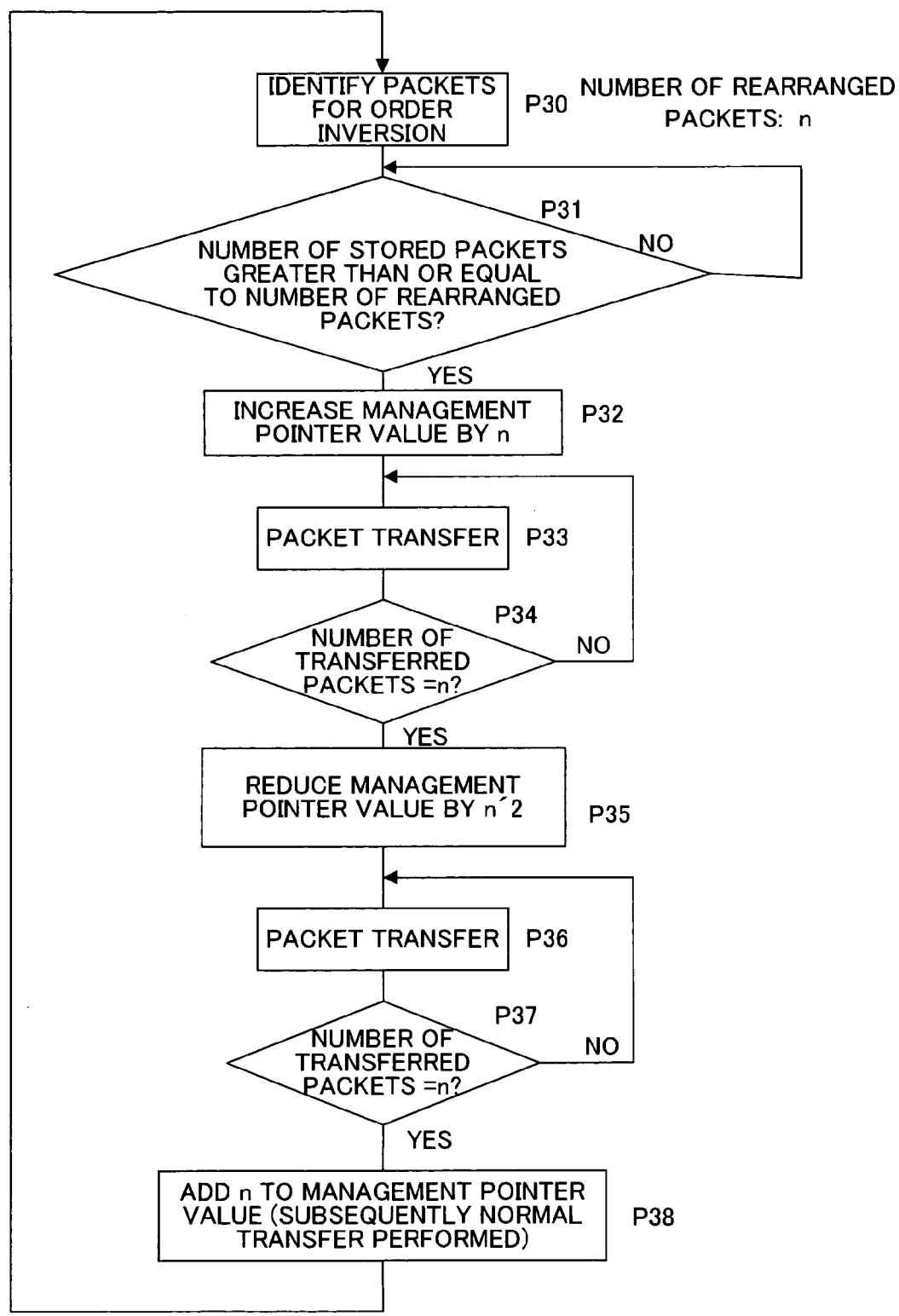
FIG. 16 shows the processing flow when packet order inversion/rerouting is caused, as an embodiment of packet operation control.

Here, as embodiments of packet operation control, FIG. 15 shows the flow of processing when generating a packet delay, and FIG. 16 shows the flow of processing when causing packet order inversion/rerouting.

As shown in FIG. 15, when a packet to be delayed is identified as explained (process P20) in FIG. 6 and the sequence flow of FIG. 8 (see processes P10 and P12), a judgment is made as to whether this is the first analysis (process P21). If this is the first analysis ("Yes" in process P21), the time stamp value is read from the packet pointer management memory 7 (process P22); and if it is not the first analysis ("No" in process P21), the time stamp value is read from the time stamp holding portion 38 (process P23).

The time stamp value thus read is compared with the device reference time, and a judgment is made as to whether the preset delay time has elapsed (process P24).

If the delay time has elapsed, the management-pointer value of the management pointer holding portion 34 is increased by one by the management pointer movement amount computation portion 37 (process P25). By this means, transfer processing moves to the next packet (process P26).

If the delay time has not elapsed, the time stamp value read from the packet pointer management memory 7 is stored in the time stamp holding portion 38 (see FIG. 6). During the next transfer analysis, the value in the time stamp holding portion 38 is compared with the reference time. By this means, the load involved in accessing the packet pointer management memory 7 is reduced, and performance is improved.

FIG. 16 shows the flow of operation during packet order inversion or rerouting. In FIG. 16, the contents of operation control corresponding to the CoS characteristic number identified by the packet type identification control portion 2 are determined, referring to the service class characteristic table 8. Hence when a packet is identified for which the operation control thus determined is order rearrangement (process P30), the transfer analysis portion 36 (see FIG. 6) judges whether the number of packets received and stored in the packet buffer memory 6 is equal to or greater than the number of packets for order rearrangement (process P31).

If the number of packets received and stored is equal to or greater than the number of packets for order rearrangement ("Yes" in process P31), then the pointer movement amount computation portion 37 notifies the management pointer holding portion 34 of the pointer movement amount for n packets for rearrangement, and adds n to the management pointer value (process P32). Next, packet transfer is performed by the transfer control portion 35 (process P33), and when transfer of then packets for packet rearrangement is completed ("Yes" in process P34), the management pointer value in the management pointer holding portion 4 is returned by subtracting n×2 (process P35).

Then, the n packets transfer of which was deferred due to the order rearrangement are transferred (process P36). When transfer of the n packets ends ("Yes" in process P37), n is added to the management pointer value of the management pointer holding portion 4, and subsequently normal transfer is performed (process P38).

In this way, by adding and subtracting to the management pointer, packets are transferred in an order different from the received order. This addition and subtraction processing of the management pointer can be realized through simple hardware in the management pointer holding portion 34, so that high-speed transfer control is possible.

As explained above referring to the drawings, through this invention the following advantageous results can be expected.

1. When allocating each service class (CoS) area, ranges can be set freely and individually. For example, broad areas can be allocated for packets for which long delay times are applied, and in similar ways maximum use can be made of the physical capacity of the packet buffer in accordance with the [CoS] characteristics.

2. With N as the overall number of service classes (CoS) identified, there are no limits on the number of physical ports or the types of characteristics.

3. A plurality of IP addresses for CoS identification can be allocated for one type of service class (CoS) characteristic.

4. control of packet operations to realize network simulations can be achieved through parallel processing using simple computations, and comparatively simple hardware circuits can be employed in high-performance packet operation control.

As explained above, by means of this invention complex operations on packets in a broadband network can be realized with high processing performance through a comparatively simple hardware configuration, and the contents of flexible packet operations can be set and realized in accordance with the desires of users. Hence the quality of communication and voice transmission between end users can be verified or secured, contributing substantially to improving the quality of IP networks.

What is claimed is:

1. A packet buffer management system used for simulating statuses of transferring packets having a variable length in an IP network, comprising:
    a packet type identification control portion attaching a TAG information for identifying a service class to a received packet, which is of a variable length and is transferred in an IP network, according to an identification information of the received packet and outputting the received packet with the TAG information,
    a buffer memory to store the received packet; and
    a buffer management control portion to control writing and reading the received packet attached with the TAG information to and from said buffer memory,
    wherein the buffer management control portion includes,
    a service class characteristic table setting characteristics for each packet in advance for the simulation of statuses of transferring packets having a variable length in an IP network by defining a packet control operation for each received packet, corresponding to a service class, which is identified by the TAG information;
    a conversion table in which allocated areas of said buffer memory corresponding to service classes are stored, and
    a packet output control portion controlling packets to output from the buffer memory,
    wherein said conversion table modifies the allocated areas of said buffer memory according to the number of service class settings in said service class characteristic table and defines output physical ports, the areas of the buffer memory being allocated based on said output physical ports, and
    said packet output control portion managing the areas of the buffer memory from which packets are to be read out and the order and timing of reading out the packets, according to contents stored in the conversion table, so as to perform the characteristics for each packet set in the service class characteristics table.

2. The packet buffer management system according to claim 1, wherein said operation control for the received packets includes delay for the packet, loss, packet order inversion, or error insertion, and said service classes are classified by an IP address or TCP/UDP port number comprised by the header portion of said packet.

3. The packet buffer management system according to claim 1, further comprising a packet pointer management memory to store transfer pointers indicating the storage position of packets stored in said packet buffer and time stamp values indicating the time at which packets are stored,
    wherein said buffer management control portion performs control of received packets based on packet existence notification and said time stamp values, and based on the operation control for the received packets, set in said service class characteristic table.

4. The packet buffer management system according to claim 3, wherein, as an operation control of said buffer management control portion, received packet order inversion and router path modification are performed by moving the transfer pointer based on said time stamp value.

5. The packet butter management system according to claim 1, wherein operations to store packets in said buffer memory, packet registration operations, transfer pointer read operations, and packet transfer analysis operations are each performed in parallel.

6. The packet buffer management system according to claim 3, further comprising means for storing in said packet pointer management memory the time of packet storage in said packet buffer as the time stamp, and for judging whether the packet can be transferred by comparing said time stamp with the reference time within the buffer management control portion at the time of packet transfer analysis, wherein when a preset delay time has not elapsed, said time stamp is stored in a time stamp buffer provided in service class units, and in subsequent transfer analysis the time stamp within said time stamp buffer is compared with the reference time.

* * * * *